US009854162B2

(12) United States Patent
Yamada et al.

(10) Patent No.: US 9,854,162 B2
(45) Date of Patent: Dec. 26, 2017

(54) PHOTOGRAPHING APPARATUS THAT SENDS AN IMAGE TO AN EXTERNAL APPARATUS WITH A SPECIFIC RESTRICTION TO PREVENT A FLAW

(71) Applicant: CASIO COMPUTER CO., LTD., Shibuya-ku, Tokyo (JP)

(72) Inventors: Takuya Yamada, Tokyo (JP); Jun Hosoda, Saitama (JP); Kazuya Nara, Tokyo (JP); Yuji Kuriyama, Tokyo (JP); Yoshinori Tomidokoro, Tokyo (JP); Toshiya Kiso, Tokyo (JP); Daisuke Otani, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 23 days.

(21) Appl. No.: 15/009,743

(22) Filed: Jan. 28, 2016

(65) Prior Publication Data
US 2016/0277674 A1 Sep. 22, 2016

(30) Foreign Application Priority Data

Mar. 19, 2015 (JP) .................. 2015-056246
Aug. 25, 2015 (JP) .................. 2015-165943

(51) Int. Cl.
*H04N 5/232* (2006.01)
*H04N 1/00* (2006.01)
*H04N 5/217* (2011.01)

(52) U.S. Cl.
CPC ..... *H04N 5/23225* (2013.01); *H04N 1/00127* (2013.01); *H04N 5/217* (2013.01); *H04N 5/23241* (2013.01)

(58) Field of Classification Search
None
See application file for complete search history.

(56) References Cited

U.S. PATENT DOCUMENTS 7,191,462 B1 * 3/2007 Roman ............ H04N 7/17318
                                                348/E7.071
7,340,766 B2   3/2008 Nagao et al.
(Continued)

FOREIGN PATENT DOCUMENTS

JP   2001111883 A   4/2001
JP   2002010188 A   1/2002
(Continued)

OTHER PUBLICATIONS

Japanese Office Action (and English translation thereof) dated Oct. 18, 2016 issued in counterpart Japanese Application No. 2015-165943.

(Continued)

*Primary Examiner* — Shahbaz Nazrul
(74) *Attorney, Agent, or Firm* — Holtz, Holtz & Volek PC

(57) ABSTRACT

A photographing apparatus includes a first processing unit, a second processing unit, and a third processing unit. The first processing unit to the external apparatus, executes a function other than sending of the photographing apparatus. The second processing unit to the external apparatus, executes a function relating to sending of the photographing apparatus. The third processing unit controls to allow exclusive execution of a function other than the sending by the first processing unit and execution of a function relating to the sending by the second processing unit in order to prevent the flaw from being caused by performing execution of a function other than the sending by the first processing unit and execution of a function relating to the sending by the second processing unit in parallel.

14 Claims, 4 Drawing Sheets

(56) References Cited

U.S. PATENT DOCUMENTS

| | | | |
|---|---|---|---|
| 8,204,437 B1* | 6/2012 | Rothschild | H04W 4/02 |
| | | | 455/41.1 |
| 8,466,987 B2* | 6/2013 | Walker | G11B 27/034 |
| | | | 348/231.7 |
| 9,609,182 B1* | 3/2017 | Millikan | H04N 5/225 |
| 2002/0051074 A1* | 5/2002 | Kawaoka | H04N 1/00307 |
| | | | 348/376 |
| 2004/0002327 A1* | 1/2004 | Tanaka | H04N 7/163 |
| | | | 455/418 |
| 2005/0003852 A1* | 1/2005 | Song | H04M 1/0218 |
| | | | 455/550.1 |
| 2009/0263012 A1* | 10/2009 | Georgis | H04N 1/00167 |
| | | | 382/163 |
| 2012/0081556 A1* | 4/2012 | Hwang | H04N 1/00411 |
| | | | 348/207.1 |
| 2015/0116511 A1* | 4/2015 | Takahashi | H04N 1/00156 |
| | | | 348/207.11 |
| 2015/0116522 A1* | 4/2015 | Tsunoda | H04N 9/8042 |
| | | | 348/211.2 |

FOREIGN PATENT DOCUMENTS

| | | |
|---|---|---|
| JP | 2002094620 A | 3/2002 |
| JP | 2002342465 A | 11/2002 |
| JP | 2003023566 A | 1/2003 |
| JP | 2003092694 A | 3/2003 |
| JP | 2003198901 A | 7/2003 |
| JP | 2006053863 A | 2/2006 |
| JP | 4629929 B2 | 2/2011 |
| JP | 2011130036 A | 6/2011 |

OTHER PUBLICATIONS

Japanese Office Action (and English translation thereof) dated Jun. 7, 2016, issued in counterpart Japanese Application No. 2015-165943.

* cited by examiner

PHOTOGRAPHING APPARATUS THAT SENDS AN IMAGE TO AN EXTERNAL APPARATUS WITH A SPECIFIC RESTRICTION TO PREVENT A FLAW

This application claims the benefit of priority of Japanese Patent Application No. 2015-056246 filed on Mar. 19, 2015 and Japanese Patent Application No. 2015-165943 filed on Aug. 25, 2015, the entire disclosure of which, including the description, claims, drawings, and abstract, is incorporated herein by reference in its entirety.

BACKGROUND OF THE INVENTION

Field of the Invention

The present invention relates to a photographing apparatus, a sending control method, and a storage medium.

Related Art

Conventionally, an image photographed by a photographing apparatus is utilized not only by the photographing apparatus which photographs the image but also by another external apparatus. For example, in Japanese Unexamined Patent Application, Publication No. 2002-342465, technology is disclosed which sends an image to an external apparatus once the image is photographed for use at the external apparatus.

SUMMARY OF THE INVENTION

A photographing apparatus that sends an image to an external apparatus, comprising: a processor that executes a first function other than sending from the photographing apparatus to the external apparatus, executes a second function relating to sending from the photographing apparatus to the external apparatus; and controls so as to allow exclusive execution of the first function and execution of the second function, in order to prevent flaw from being caused by performing execution of the first function and execution of the second function in parallel, wherein the processor controls to restrict or release execution of the second function at a timing different from a timing at which it is necessary to prevent the flaw.

A sending control method executed in a photographing apparatus that sends an image to an external apparatus, comprising: a first processing of executing a function other than sending from the photographing apparatus to the external apparatus; a second processing of executing a function relating to sending from the photographing apparatus to the external apparatus; and control processing of allowing exclusive control execution of a function other than sending in the first processing and execution of a function relating to sending in the second processing in order to prevent flaw from being caused by performing execution of a function other than sending in the first processing and execution of a function relating to sending in the second processing in parallel, wherein the control processing controls to restrict or release execution of a function relating to sending in the second processing at a timing different from a timing at which it is necessary to prevent the flaw.

A non-transitory storage medium encoded with a computer-readable program that enables a computer, which controls a photographing apparatus to send an image to an external apparatus, to execute: a first execution function that executes a function other than sending from the photographing apparatus to the external apparatus; a second execution function that executes a function relating to sending from the photographing apparatus to the external apparatus; and a control function that allows exclusive control execution of a function other than sending by the first execution function and execution of a function relating to sending by the second execution function, in order to prevent flaw from being caused by performing execution of a function other than sending by the first execution function and execution of a function relating to sending by the second execution function in parallel, wherein the control function controls to restrict or release execution of a function relating to sending by the second execution function at a timing different from a timing at which it is necessary to prevent the flaw.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

By considering the present application in combination with the following detailed descriptions with the following drawings, deeper understanding of the present application can be obtained.

DETAILED DESCRIPTION OF THE INVENTION

Embodiments of the present invention are explained below with reference to the drawings.

Figure 1:
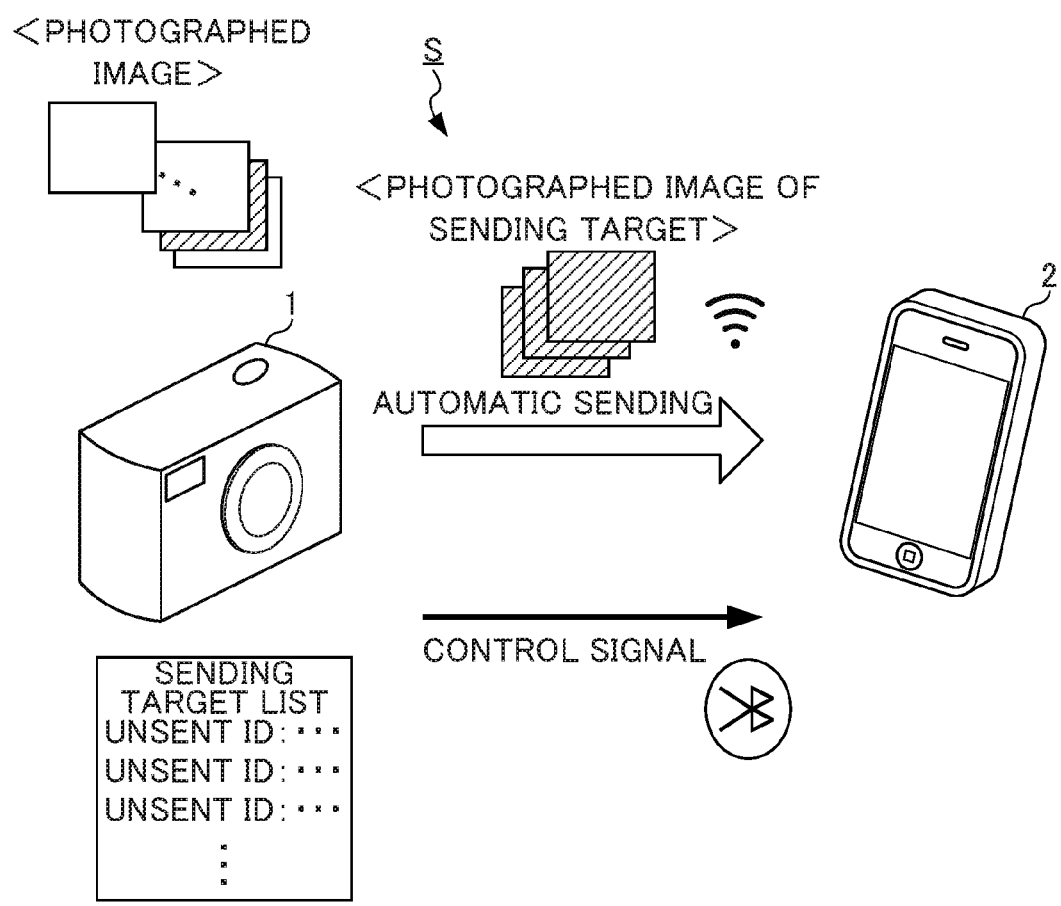
FIG. 1 is a system configuration diagram illustrating a system configuration of an image sending system according to one embodiment of the present invention.

FIG. 1 is a system configuration diagram illustrating a system configuration of an image sending system S according to one embodiment of the present invention.

As illustrated in FIG. 1, the image sending system S includes a photographing apparatus 1 and a mobile terminal apparatus 2.

The image sending system S has a function of automatically sending an image photographed by the photographing apparatus 1 (hereinafter, referred to as "photographed image") to the mobile terminal apparatus 2 which is an external apparatus, after photographing.

In the present embodiment, the photographing apparatus 1 sends only a photographed image which is set as a sending target (hatched in the drawings) among photographed images to the mobile terminal apparatus 2. The photographing apparatus 1 retains a sending target list which manages the sending targets of photographed images and sending status using an ID of the photographed image, and sends the photographed image by referencing the sending target list. In other words, the photographing apparatus 1 sends a corresponding photographed image to the mobile terminal apparatus 2 based on an unsent ID stored in the sending target list. It should be noted that the setting to a sending target is performed based on the setting at the time of photographing (automatic sending setting: ON/OFF), for example.

Regarding exclusive control processing in the photographing apparatus 1, normal functions and an automatic sending function below are controlled exclusively:
(1) static image photographing, moving image photographing, and moving image playback;
(2) standby state of special effect photographing (past movie function, slide panorama function, interval photographing function, etc.),
(3) image processing function (movie cutting (trimming), multiple printing for continuous shooting, quick collage function, etc.,
(4) file processing (file deletion, file transfer by way of USB (Universal Serial Bus) connection, etc.), and
(5) other communication function.

While the processing of (1) to (5) is executed, the automatic sending processing is restricted (not started or performed with limited processing), or in a case of the processing being started while the automatic sending processing is executed, the automatic sending processing is restricted.

Furthermore, in the image sending system S of the present embodiment, the photographing apparatus 1 uses two communication methods when sending an image. In other words, an image is sent by way of the two communication methods of a wireless communication method (hereinafter, referred to as "first communication method" which is high-speed and adapted for sending and receiving files, and a wireless communication method (hereinafter, referred to as "second communication method") which is low-speed but low electric power consumption and adapted for full-time connection.

It should be noted that, in the present embodiment, the first communication method uses a communication method based on a communication standard of Wi-Fi (Wireless Fidelity) in wireless LAN (Local Area Network). Furthermore, it should be noted that, in the present embodiment, the second communication method uses a communication method based on a communication standard of Bluetooth low energy/Bluetooth LE (Trademark) (hereinafter, referred to as "BLE").

A case of performing the automatic sending function of a photographed image in the image sending system S of the present embodiment is performed in a state of the communication between the photographing apparatus 1 and the mobile terminal apparatus 2 being established by way of BLE, which is the second communication method (full-time connection state). In other words, the automatic sending function of a photographed image is performed on the premise that the connection is established by BLE, which is the second communication method, between the photographing apparatus 1 and the mobile terminal apparatus 2.

More specifically, an instruction (control signal) is outputted from the photographing apparatus 1 to the mobile terminal apparatus 2 to establish a communication by Wi-Fi, which is the first communication method, via the communication by way of the second communication method so that the communication by way of Wi-Fi, which is the first communication method, is established between the photographing apparatus 1 and the mobile terminal apparatus 2. It should be noted that, in the present embodiment, communication by way of a one-to-one direct communication between the photographing apparatus 1 and the mobile terminal apparatus 2 is established with the photographing apparatus 1 set as a main device in Wi-Fi and with the mobile terminal apparatus 2 set as a sub device in Wi-Fi, which is the first communication method.

Then, an image is sent by way of the first communication method from the photographing apparatus 1 to the mobile terminal apparatus 2. With such a configuration, it becomes possible to receive an image by way of the first communication method without performing an operation at the mobile terminal apparatus 2.

Furthermore, the mobile terminal apparatus 2 stores and manages a photographed image received from the photographing apparatus 1, for example, and utilizes the photographed image at an external apparatus by way of uploading to a cloud server for the purpose of sharing images with another external apparatus.

Figure 2:
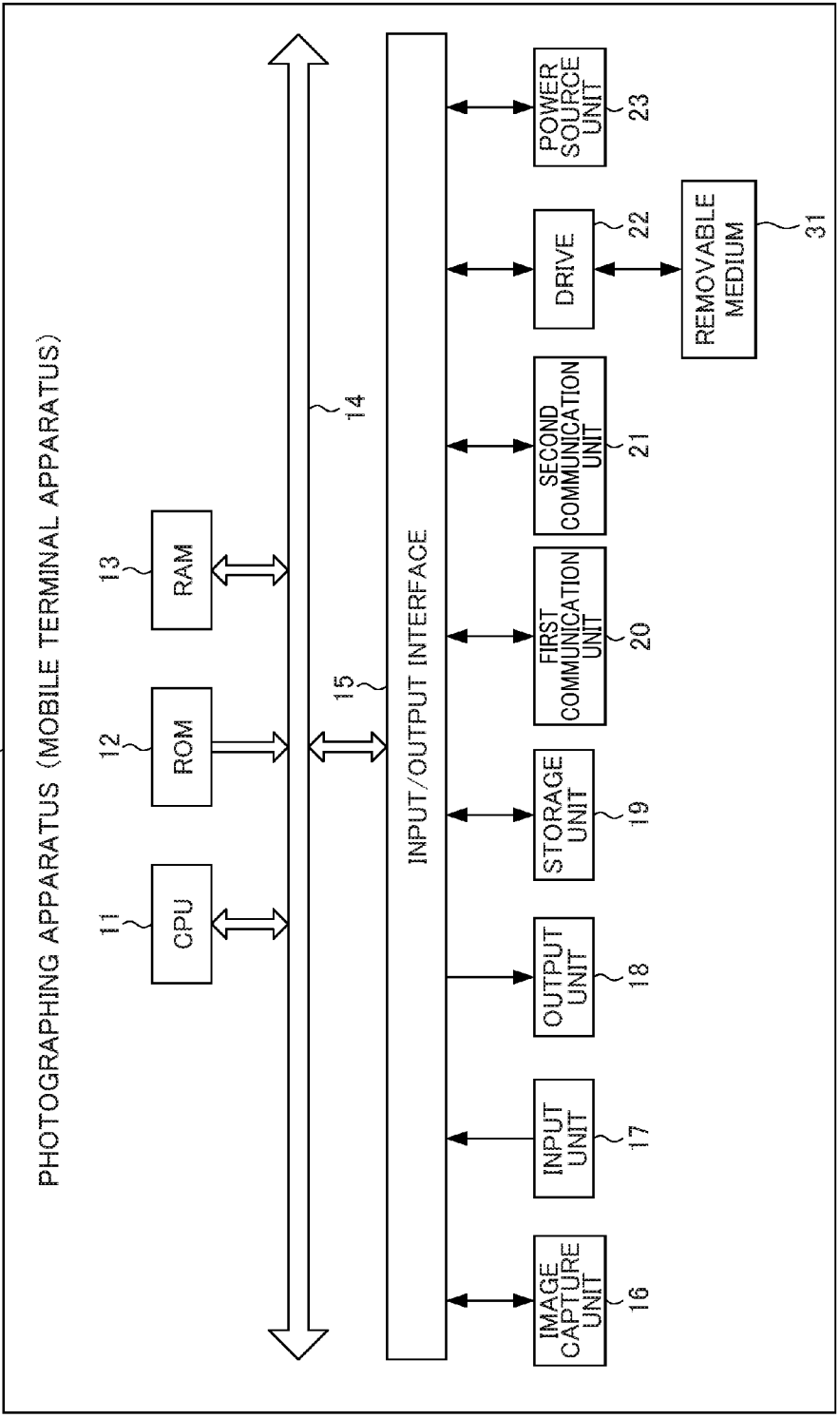
FIG. 2 is a block diagram illustrating a hardware configuration of a photographing apparatus and a mobile terminal apparatus according to one embodiment of the present invention.

FIG. 2 is a block diagram showing the hardware configuration of a photographing apparatus 1 and a mobile terminal apparatus 2 according to an embodiment of the present invention.

The photographing apparatus 1 is configured as, for example, a digital camera.

The photographing apparatus 1 includes a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a first communication unit 20, a second communication unit 21, a drive 22, and a power supply unit 23.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the first communication unit 20, the second communication unit 21, the drive 22, and the power supply unit 23 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a photographed image". Data of a photographed image is supplied to the CPU 11, an image processing unit (not illustrated), and the like as appropriate.

The input unit 17 is configured by various buttons and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The first communication unit 20 controls communication with an external apparatus (in the present embodiment, the mobile terminal apparatus 2) by way of the wireless communication method (hereinafter, referred to as "first communication method") that is high-speed and adapted for sending and receiving a file. In the present embodiment, the first communication method uses a communication method based on a communication standard of Wi-Fi (Wireless Fidelity) in wireless LAN (Local Area Network).

The second communication unit 21 controls communication with an external apparatus (in the present embodiment, the mobile terminal apparatus 2) by way of the wireless communication method (hereinafter, referred to as "second communication method") which is low-speed but low electric power consumption, and suited for full-time connection. In the present embodiment, the second communication method uses a communication method based on a communication standard of Bluetooth low energy/Bluetooth LE (Trademark) (hereinafter, referred to as "BLE").

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 19, as necessary. Similarly to the storage unit 19, the removable medium 31 can also store a variety of data such as the image data stored in the storage unit 19.

The power supply unit 23 is a power supply source that is configured by a lithium ion secondary battery and supplies electric power for driving to the photographing apparatus 1 via a power supply circuit (not illustrated), and supplies electric current as a driving source of the photographing apparatus 1 to each configuration of the photographing apparatus 1. The power supply unit 23 is controlled by the CPU 11, for example, so as to stop supplying electric power to the output unit 18, etc., to turn off display output in a state of the power supply being turned off, to maintain supplying the electric power for the communication of the first communication unit 20 and the second communication unit 21, and send an image even in a state of the power supply being turned off.

Furthermore, the mobile terminal apparatus 2 is configured as a tablet terminal, for example.

It should be noted that the explanations for the hardware configuration are omitted since it is similar to that of the photographing apparatus 1. Hereafter, in a case of employing the hardware of the photographing apparatus 1 and the mobile terminal apparatus 2 for explanations, "-1" is attached to the end of the reference numeral of the photographing apparatus 1 and "-2" is attached to the end of the reference numeral of the mobile terminal apparatus 2. In other words, for the photographing apparatus 1, the hardware is denoted as CPU 11-1 to the removable medium 31-1, and for the mobile terminal apparatus 2, the hardware is denoted as CPU 11-2 to the removable medium 31-2.

Figure 3:
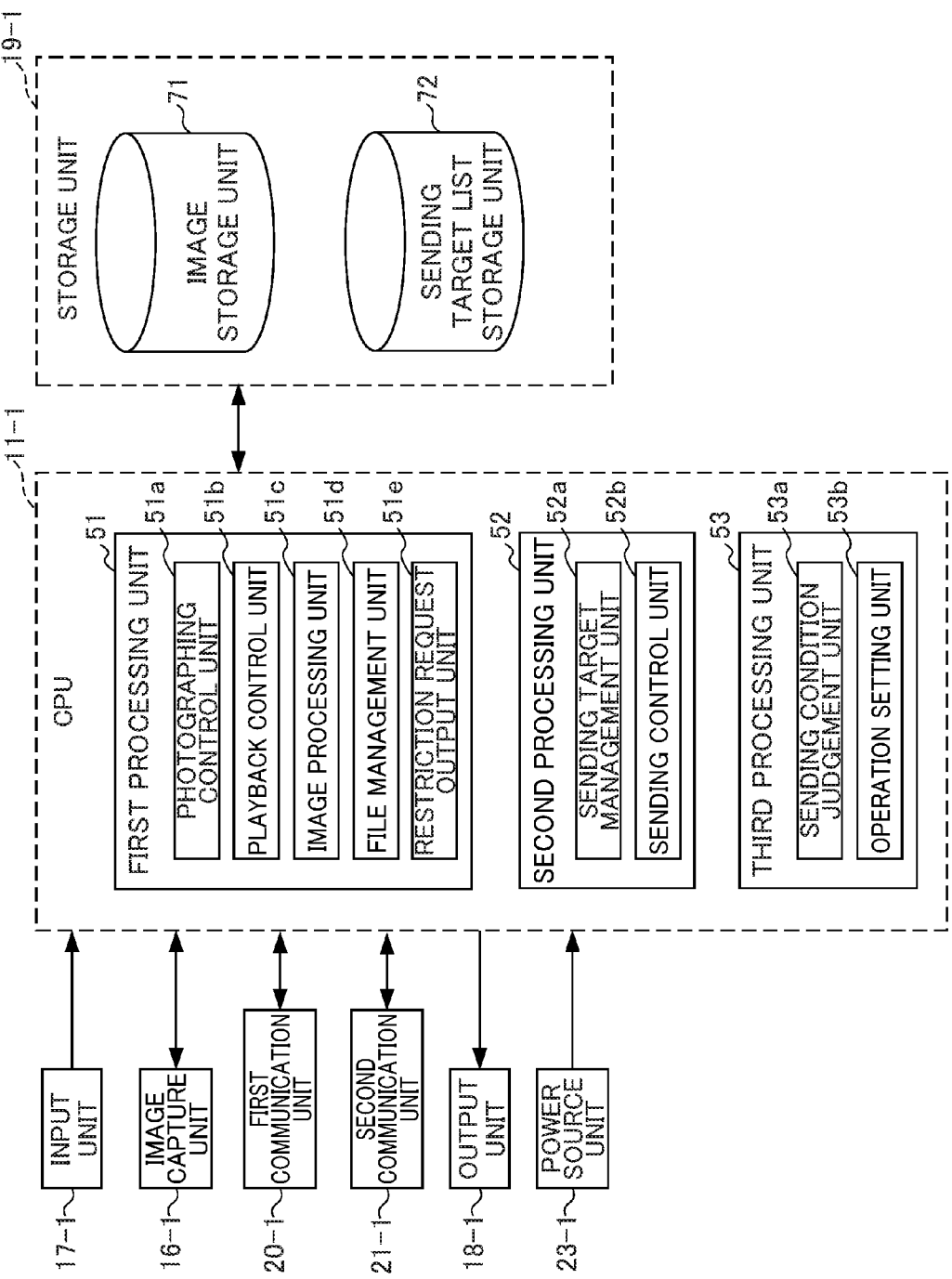
FIG. 3 is a functional block diagram illustrating a functional configuration for executing automatic sending control processing among functional configurations of the photographing apparatus of FIG. 2.

FIG. 3 is a functional block diagram illustrating a functional configuration for executing automatic sending control processing among functional configurations of the photographing apparatus 1.

The automatic sending control processing refers to a sequence of processing of automatically sending a photographed image to an external apparatus (in the present embodiment, the mobile terminal apparatus 2) while performing exclusive control to other processing.

In a case of executing the automatic sending control processing, as illustrated in FIG. 3, in the CPU 11-1, a first processing unit 51, a second processing unit 52, and a third processing unit 53 function.

Furthermore, an image storage unit 71 and a sending target list storage unit 72 are set in one region of a storage unit 19-1.

In the image storage unit 71, data of a photographed image generated by photographing and acquired from the image capture unit 16-1 are stored.

In the sending target list storage unit 72, a sending target list for managing a sending status of a photographed image, which is set as a sending target among the photographed images stored in the image storage unit 71, is stored. In the present embodiment, IDs of unsent images are stored in the sending target list as a sending status of images. The sending status of the images is managed by the IDs being deleted from the sending target list when the sending of the images set as targets is completed. In other words, only the IDs of unsent images among the images set as sending targets are stored in the sending target list, and the IDs of images set as non-sending targets and the IDs of sent images among sending targets are not stored.

The first processing unit 51 performs processing of executing normal functions including photographing, playing back, image processing, and file management in the photographing apparatus 1. Furthermore, in a case of executing a variety of functions, the first processing unit 51 outputs a restriction request to request to restrict the automatic sending processing of the images at the second processing unit 52 to the third processing unit 53. Furthermore, the first processing unit 51 outputs warning information to warn that specific processing is executed when an operation of specific processing at a preparation level is performed to the third processing unit 53.

More specifically, the first processing unit 51 includes a photographing control unit 51a, a playback control unit 51b, an image processing unit 51c, a file management unit 51d, and a restriction request output unit 51e.

The photographing control unit 51a controls pressing a shutter button and photographing by the image capture unit 16-1 according to a variety of settings such as time-lapse, interval, past movie, slide panorama and self timer. Data of a photographed image photographed according to the control by the photographing control unit 51a are stored in the image storage unit 71. Here, time-lapse refers to a photographing method to combine static images or moving images photographed automatically in a predetermined time interval to create one moving image. Interval refers to a photographing method to automatically photograph static images or moving images in a predetermined time interval. Past movie refers to a photographing method to retain moving images during a predetermined time before an operation to start photographing so that the moving images can be set as recording targets. Slide panorama refers to a photographing method to create a wide-angle panorama image by compositing static images photographed by way of continuously shooting while sliding the angle of field of the photographing apparatus 1.

The playback control unit 51*b* plays back the static images or the moving images stored in the image storage unit 71 or the removable medium 31-1 according to a user's instruction.

The image processing unit 51*c* executes image processing such as movie cutting, multiple printing for continuous shooting and quick collage, according to a user's instruction. Here, movie cutting refers to processing of cutting a scene before or after a scene designated by a user. Multiple printing for continuous shooting refers to processing of arranging a plurality of static images photographed by continuous shooting to create one static image. Quick collage refers to processing of combining a plurality of images selected automatically to create one collage image.

The file management unit 51*d* manages copying files, deleting files, moving files, transferring files between apparatuses connected via USB, etc.

The restriction request output unit 51*e* outputs a restriction request including information indicating processing contents at the photographing control unit 51*a*, the playback control unit 51*b*, and the image processing unit 51*c* to the third processing unit 53. It should be noted that the restriction request output unit 51*e* outputs a release request to release a restriction of the automatic sending processing at the second processing unit 52 in a case in which the processing causing the restriction request ends.

Furthermore, at the first processing unit 51, the restriction request output unit 51*e* outputs, to the third processing unit 53, warning information to warn that specific processing is executed when an operation of specific processing at a preparation level is performed. For example, in a case in which an operation of half-pressing a shutter button is performed before the shutter button being pressed to photograph a static image, since it is highly probable that photographing a static image will be performed, the restriction request output unit 51*e* outputs warning information indicating that the operation of half-pressing the shutter button was performed (i.e. indicating to warn that the shutter button is pressed) to the third processing unit 53. Similarly, in a case of performing processing which greatly burdens or processing which takes a relatively longer time such as special effect photographing including time-lapse, interval, past movie, slide panorama, and self timer, playing back a moving image, movie cutting, multiple printing for continuous shooting and quick collage (for example, in a case in which a setting to execute the processing is performed), it may also be configured so that the restriction request output unit 51*e* outputs warning information to warn that the processing is executed. It should be noted that the restriction request output unit 51*e* outputs warning cancellation information to cancel warning information to the third processing unit 53 in a case in which the specific processing warned was not executed (for example, the specific processing warned was not executed within a predetermined time) after outputting the warning information.

The second processing unit 52 executes the automatic sending processing of images (static images or moving images) from the photographing apparatus 1 to an external apparatus.

More specifically, the second processing unit 52 includes a sending target management unit 52*a* and a sending control unit 52*b*.

The sending target management unit 52*a* specifies an image stored in the image storage unit 71 based on IDs of unsent images stored in the sending target list storage unit 72, and sets the image as a target for automatic sending.

The sending control unit 52*b* sends the image which is set as a target for automatic sending by the sending target management unit 52*a* to an external apparatus via the first communication unit 20-1. At this moment, the sending control unit 52*b* controls the execution sending or stopping sending to an external apparatus at the first communication unit 20-1, sending power or sending speed, or operation clock, according to exclusive control by the third processing unit 53.

The third processing unit 53 performs processing of allowing exclusive control of the first processing unit 51 and the second controlling unit 52. Here, the exclusive control in the present embodiment includes control to operate the second processing unit 52 but restrict the operation of the second processing unit 52, while giving priority to the first processing unit 51, as well as control to stop the second processing unit 52 to alternatively operate the first processing unit 51 only. In the third processing unit 53, it is possible to allow exclusive control of the first processing unit 51 and the second processing unit 52 based on viewpoints such as competing for memory (physical volume or address), competing of functions of a processing circuit (i.e. hardware competing), logical competing of algorithm of software (for example, an identical parameter is set as a target for processing), peak electric current, heat generation and noise.

More specifically, the third processing unit 53 includes a sending condition judgment unit 53*a* and an operation setting unit 53*b*.

The sending condition judgment unit 53*a* judges a condition of an operation (sending of an image to an external apparatus) at the second processing unit 52 based on a restriction request or warning information inputted from the restriction request output unit 51*e*. In other words, the sending condition judgment unit 53*a* judges a condition of an operation that is accepted by the second processing unit 52 according to processing contents at the first processing unit 51 indicated by the restriction request or the warning information.

For example, the sending condition judgment unit 53*a* judges that the situation is that of sending of an image to an external apparatus at the second processing unit 52 not being accepted in a case of photographing static images at the first processing unit 51 being executed (or having been executed). Furthermore, the sending condition judgement unit 53*a* judges that the situation is that of power of sending an image to an external apparatus at the second processing unit 52 being made lower (suppressing electric power for communication) in a case in which a moving image is photographed (or has been photographed), at the first processing unit 51. This is because, when a moving image is photographed, since current draw to a moving image processing engine increases, the electric power that can be used for communication reduces. Furthermore, the sending condition judgement unit 53*a* judges that the situation is that of an interval of sending image data (packet) to an external apparatus at the second processing unit 52 being made greater and sending speed reducing (restricting communication speed) in a case in which high-load image processing is executed (or has been executed), at the first processing unit 51. This is because the heat generation amount greatly increases intermittently due to high-load image processing such as advanced image processing, and thus a case of exceeding an acceptable heat generation amount due to operating the first processing unit 51 and the second processing unit 52 simultaneously may arise. Furthermore, the sending condition judgement unit 53a judges that the situation is that of the operation clock at the second processing unit 52 being made lower (restricting operation clock) in a case in which playing back a moving image is executed (or has been executed), at the first processing unit 51. This is because a signal with a specific clock frequency propagates in a circuit by the communication at the second processing unit 52 and a case of noise being included in a moving image or sound may arise.

The sending condition judgment unit 53a sets a flag for setting a condition of an operation at the second processing unit 52 (hereinafter, referred to as "operation condition setting flag") based on the judgement results. The operation condition setting flag is constituted by 4-bit data, for example, and in an initial state, all bits are set as "0" (a state of the flag being not flagged). Then, the sending condition judgment unit 53a sets the first bit of the operation condition setting flag as "1" (a state of the flag being flagged) in a case of judging that the situation is that of sending an image to an external apparatus at the second processing unit 52 not being permitted. Similarly, the sending condition judgment unit 53a sets the second bit of the operation condition flag as "1" in a case of having judged as being a situation in which power of sending an image to an external apparatus at the second processing unit 52 is made lower (suppressing electric power for communication), sets the second bit of the operation condition flag as "1" in a case of having judged as being a situation is which an interval of sending image data (packet) to an external apparatus at the second processing unit 52 is made greater and sending speed reduces (restricting communication speed), and sets the second bit of the operation condition flag as "1" in a case of having judged as being a situation in which operation clock at the second processing unit 52 is made lower (restricting operation clock).

Furthermore, the sending condition judgement unit 53a returns the operation condition setting flag to "0" and releases a restriction of an operation at the second processing unit 52 in a case in which a release request or warning cancellation information was inputted from the restriction request output unit 51e.

The operation setting unit 53b controls the operation in the second processing unit 52 and executes the exclusive control in the first processing unit 51 and the second processing unit based on the setting contents of the operation condition setting flag. In other words, the operation setting unit 53b sets a situation of not permitting sending an image to an external apparatus at the second processing unit 52 in a case of the first bit of the operation condition setting flag being "1", and sets a situation in which electric power for sending an image to an external apparatus at the second processing unit 52 is made lower (restricting an electric power for communication) in a case of the second bit of the operation condition setting flag being "1". Furthermore, the operation setting unit 53b sets a situation in which an interval of sending image data (packet) to an external apparatus at the second processing unit 52 is made greater and sending speed reduces (restricting communication speed) in a case of the third bit of the operation condition setting flag being "1", and sets a situation in which the operation clock of the second processing unit 52 is made lower (restricting operation clock) in a case of the fourth bit of the operation condition setting flag being "1".

It should be noted that the operation setting unit 53b judges whether the first bit is "1" or not, and gives the first bit priority over the other bits of the operation condition setting flag. With such a configuration, it is possible to promptly judge that sending an image to an external apparatus at the second processing unit 52 has not been permitted and stop the operation.

In this way, in the present embodiment, the operation setting unit 53b controls the operation ahead at the second processing unit 52 and starts the exclusive control at an earlier stage according to the processing contents indicated by the warning information in a case in which warning information is inputted from the restriction request output unit 51e. With such a configuration, in a case in which it is highly probable that specific processing will be executed, it is possible to restrict an operation of the second processing unit 52 in advance and to prevent execution of the specific processing from being delayed.

Furthermore, in a case in which the operation condition setting flag is set as "0" from "1" by the sending condition judgment unit 53a by the release request or the warning cancellation information being inputted only to enter a state in which the restriction of the operation at the second processing unit 52 can be released after starting the exclusive control, the operation setting unit 53b releases by delaying the restriction of the operation at the second processing unit 52 by a standby time set in advance (for example, 5 seconds). With such a configuration, even in a case in which the operation of half-pressing a shutter button, etc., is repeated at short intervals by a user or photographing is repeated, it is possible to prevent the start and the release of the restriction of the operation from being repeated inappropriately at the second processing unit 52.

In other words, by starting or ending the restriction of the operation at the second processing unit 52 at a timing different from the timing at which the processing of the first processing unit 51 starts or ends, it becomes possible to appropriately control the processing at the first processing unit 51 and the automatic sending processing at the second processing unit 52.

Next, operations will be described.

Automatic Sending Control Processing

Figure 4:
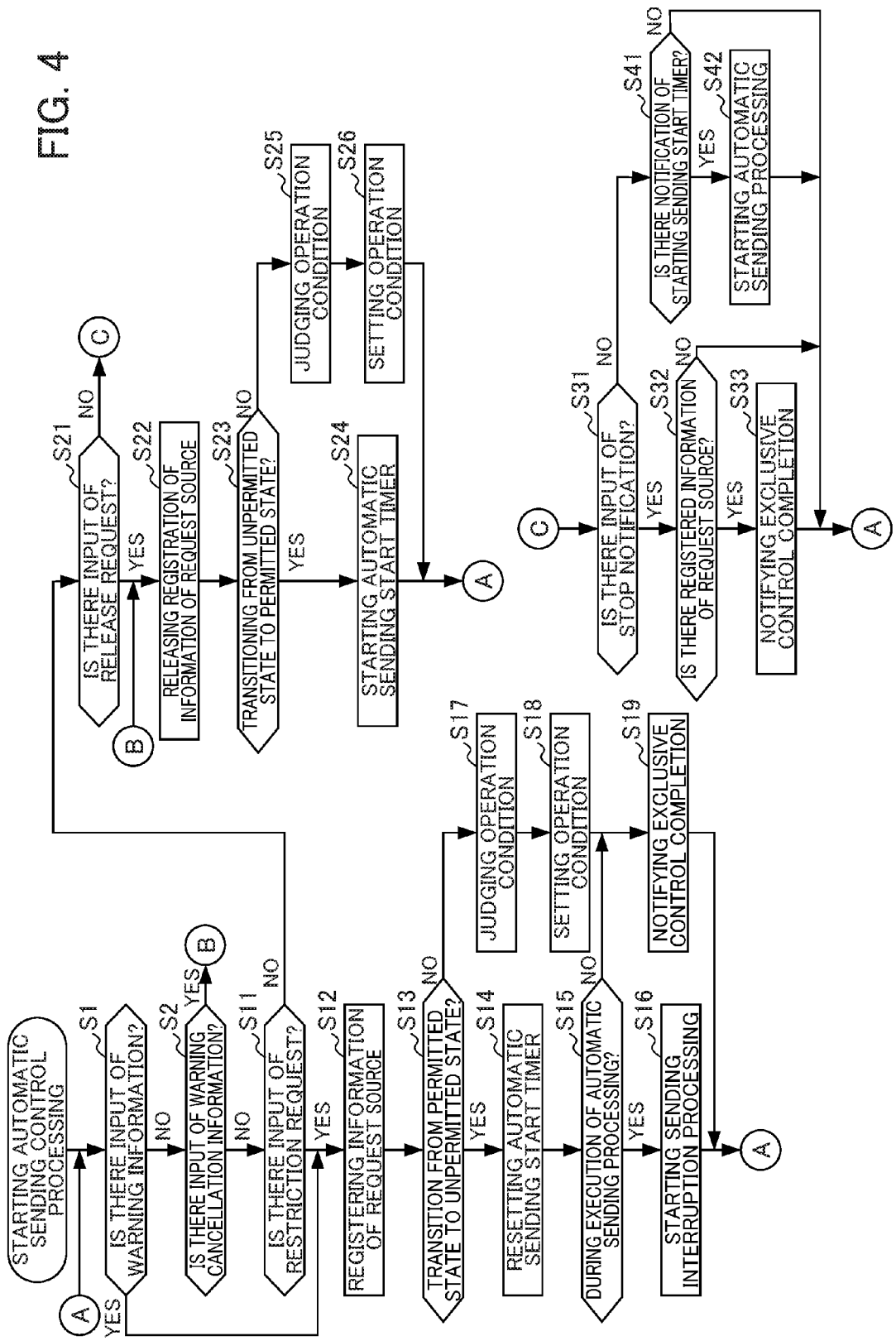
FIG. 4 is a flowchart for illustrating a flow of automatic sending control processing executed by the photographing apparatus of FIG. 2 having the functional configuration of FIG. 3.

FIG. 4 is a flowchart for illustrating a flow of automatic sending control processing executed by the photographing apparatus 1 FIG. 2 having the functional configuration of FIG. 3.

The automatic sending control processing starts when electric power is supplied to the photographing apparatus 1.

The sending condition judgement unit 53a in the third processing unit 53 judges whether warning information has been inputted from the first processing unit 51 (Step S1), in a case of having judged that the warning information has not been inputted (NO in Step S1), and judges whether the warning cancellation information has been inputted from the first processing unit 51 (Step S2).

The sending condition judgment unit 53a judges whether the restriction request of the automatic sending processing has been inputted from the first processing unit 51 (Step S11) in a case of having judged that warning cancellation information has not been inputted from the first processing unit 51 (NO in Step S2).

In a case of having judged that warning information has been inputted from the first processing unit 51 in Step S1 (YES in Step S1) or in a case of having judged that the restriction request of the automatic sending processing has been inputted from the first processing unit 51 in Step S11 (YES in Step S11), the sending condition judgment unit 53a registers information of a request source (stores processing contents indicated by the warning information or the restriction request) (Step S12). In Step S12, the operation condition setting flag is also set as "1" by the sending condition judgment unit 53a.

Then, the sending condition judgment unit 53a judges whether it is necessary to transition from a permitted state to an unpermitted state of sending an image to an external apparatus at the second processing unit 52 (Step S13). At this moment, the sending condition judgement unit 53a judges whether the first bit of the operation condition setting flag was set as "1" from "0".

In a case of having judged that it is necessary to transition in Step S13 (YES in Step S13), the sending condition judgment unit 53a resets an automatic sending start timer (Step S14), the operation setting unit 53b judges whether the automatic sending processing is in execution (Step S15), in a case of having judged that the automatic sending processing is in execution (YES in Step S15), the operation setting unit 53b starts automatic sending suspension processing to suspend the automatic sending processing at the sending control unit 52b of the second processing unit 52 (Step S16), and the processing returns to Step S1.

It should be noted that the automatic sending start timer refers to a timer of counting in a case in which the automatic sending processing of an image to an external apparatus is performed, and a time during the automatic sending start timer being counted indicates a state in which sending an image from the photographing apparatus 1 to an external apparatus is permitted.

On the other hand, in a case in which it is unnecessary to transition from a permitted state to an unpermitted state of sending an image to an external apparatus at the second processing unit 52 in Step S13 (NO in Step S13), the sending condition judgment unit 53a references the second bit to the fourth bit of the operation condition setting flag, and judges a condition of the operation at the second processing unit 52 (Step S17), and the operation setting unit 53b sets a condition of the operation at the second processing unit 52 indicated by the operation condition setting flag (Step S18). With such a configuration, the exclusive control (restriction of an operation) at the second processing unit 52 is realized.

Subsequent to Step S18, or in a case of having judged that the automatic sending processing is not in execution in Step S15 (NO in Step S15), the operation setting unit 53b notifies the first processing unit 51 that the exclusive control has completed (Step S19), and the processing returns to Step S1.

The sending condition judgment unit 53a judges whether the release request of the restriction of the automatic sending processing has been inputted from the first processing unit 51 (Step S21) in a case of having judged that the restriction request of the automatic sending processing has not been inputted from the first processing unit 51 (NO in Step S11).

In a case of having judged that the release request has been inputted in Step S21 (YES in Step S21), or in a case of having judged that the warning cancellation information has been inputted from the first processing unit 51 in Step S2 (YES in Step S2), the sending condition judgment unit 53a releases information of a request source (deletes the stored processing contents indicated by the warning information or the restriction request) (Step S22). In Step S22, the operation condition setting flag is also set as "0" by the sending condition judgment unit 53a.

Then, the sending condition judgment unit 53a judges whether it is necessary to transition from a permitted state to an unpermitted state of sending an image to an external apparatus at the second processing unit 52 (Step S23) and, in a case of having judged that it is necessary to transition (YES in Step S23), starts the automatic sending start timer (Step S24), and the processing returns to Step S1.

On the other hand, in a case in which it is unnecessary to transition from an unpermitted state to a permitted state of sending an image to an external apparatus at the second processing unit 52 (NO in Step S23), the sending condition judgment unit 53a references the second bits to the fourth bits of the operation condition setting flag, and judges a condition of the operation at the second processing unit 52 (Step S25), and the operation setting unit 53b sets a condition of the operation at the second processing unit 52 indicated by the operation condition setting flag (Step S26). With such a configuration, the exclusive control (restriction of an operation) at the second processing unit 52 ends. At this moment, releasing is performed by delaying the restriction of the operation at the second processing unit 52 by a predetermined set standby time (for example, 5 seconds).

After Step S26, the processing returns to Step S1.

In a case of having judged that the restriction request of the automatic sending processing has not been inputted from the first processing unit 51 (NO in Step S11), and furthermore, in a case of having judged that the release request of the automatic sending processing has not been inputted from the first processing unit 51 (NO in Step S21), the sending condition judgment unit 53a judges whether the notification of having stopped the automatic sending processing from the sending control unit 52b of the second processing unit 52 (notification of stopping) has been inputted (Step S31), in a case of having judged that the notification of stopping the automatic sending processing has been inputted (YES in Step S31), the sending condition judgment unit 53a judges whether there is registered information of a request source (stores processing contents indicated by the warning information or the restriction request) (Step S32), and in a case of having judged that there is registered information of a request source (YES in Step S32), the sending condition judgment unit 53a notifies the first processing unit 51 that the exclusive control has completed (Step S33). Then, the processing returns to Step S1.

On the other hand, in a case of the sending condition judgment unit 53a having judged that there is no registered information in Step S32 (NO in Step S32), the processing returns to Step S1.

In a case of having judged that the restriction request of the automatic sending processing has not been inputted from the first processing unit 51 (NO in Step S11), that the release request of the automatic sending processing has not been inputted from the first processing unit 51 (NO in Step S21), and, furthermore, that there is no notification of stopping the automatic sending processing from the sending control unit 52b of the second processing unit 52 (NO in Step S31), the sending control unit 52b judges whether starting the automatic sending start timer has been notified (Step S41), and in a case of having judged that starting the automatic sending start timer has been notified (YES in Step S41), the automatic sending processing starts (Step S42), and the processing returns to Step S1. It should be noted that, in Step S42, starting the automatic sending processing in the second processing unit 52 is started by delaying by a standby time that is set beforehand (for example, 5 seconds).

On the other hand, in a case in which the sending control unit 52b judges that starting the automatic sending start timer has not been notified (NO in Step S41), the processing returns to Step S1.

As described above, the photographing apparatus 1 according to the present embodiment allows the automatic sending in the background of the functions other than the sending function in the photographing apparatus, and facilitates the addition of exclusive control processing by way of processing a variety of functions in the photographing apparatus equally regardless of an excluding factor or processing level, and allowing control even if there are a plurality of factors in the exclusive control processing.

Furthermore, it is possible to increase the situations in which communication processing can be executed in the photographing apparatus 1 by employing different control to restrict the operation in the second processing unit 52 and handling with a method other than stopping the operation according to factors causing to perform the exclusive control. Therefore, it is possible to perform sending an image quicker.

The photographing apparatus 1 configured as above includes the first processing unit 51, the second processing unit 52, and the third processing unit 53.

The first processing unit 51 to the external apparatus, executes a function (first function) other than sending of the photographing apparatus 1.

The second processing unit 52 to the external apparatus, executes a function (second function) relating to sending of the photographing apparatus 1.

The third processing unit 53 controls to allow exclusive execution of a function (first function) other than the sending by the first processing unit 51 and execution of a function (second function) relating to the sending by the second processing unit 52 in order to prevent flaw from occurring due to performing execution of a function (first function) other than the sending by the first processing unit 51 and execution of a function (second function) relating to the sending by the second processing unit 52 in parallel.

The third processing unit 53 controls to restrict or release execution of the function (second function) relating to the sending by the second processing unit 52 at a timing different from the timing at which it is necessary to prevent flaw.

With such a configuration, it becomes possible to control the execution of the function (first function) other than the sending at the first processing unit 51 and the execution of the function (second function) relating to the sending at the second processing unit 52 appropriately.

The function (first function) other than the sending executed by the first processing unit 51 is a photographing function that creates a photographed image by performing photographing processing on a captured image captured by an image capture unit.

The function (second function) relating to the sending executed by the second processing unit 52 is an automatic sending function that performs processing of automatically sending a photographed image photographed by the photographing function to an external apparatus.

The flaw is caused when photographing processing and processing of automatically sending are performed in parallel.

With such a configuration, it is possible to appropriately control by giving the photographing processing priority over the processing of sending a photographed image to an external apparatus.

The third processing unit 53 restricts execution of processing of automatically sending by the second processing unit 52 at a timing earlier than the timing at which the first processing unit 51 starts execution of the photographing function.

With such a configuration, it is possible to prevent the execution of the photographing function from being delayed.

When transitioning to a photographing standby state is detected, the third processing unit 53 performs control to restrict processing of automatically sending by the second processing unit 52 even before the photographing processing.

With such a configuration, it is possible to reliably prevent the execution of the photographing function from being delayed when a photographing standby state in which the execution of photographing is highly probable, such as half shutter, thereafter is detected.

The third processing unit 53 releases restriction of the processing of automatically sending by the second processing unit 52 at a timing later than the timing at which the first processing unit 51 ends the execution of the photographing function.

With such a configuration, it is possible to prevent the start and release of the restriction of an operation from being repeated inappropriately, at the second processing unit 52.

Even when ending of the photographing processing is detected, the third processing unit 53 performs control to release the restriction of processing of automatically sending by the second processing unit 52 after a predetermined lapse of time.

With such a configuration, even when a predetermined operation is repeated by a user, for example, it is possible to prevent the start and release of the restriction of an operation from being repeated inappropriately, at the second processing unit 52.

A predetermined time refers to a time during which it is possible to prevent flaw caused in a case in which the execution of the photographing processing is started continuously after ending the photographing processing from being caused.

With such a configuration, in a case of photographing being repeated, it is possible to prevent the start and release of the restriction of an operation from being repeated inappropriately at the second processing unit 52.

The third processing unit 53 executes at least one of control to stop the function (second function) relating to the sending by the second processing unit 52 in order to execute the function (first function) other than the sending by the first processing unit 51 and control to limit the function (second function) relating to the sending by the second processing unit 52 in order to give the execution of the function (first function) other than the sending by the first processing unit 51 priority over the execution of the function (second function) relating to the sending by the second processing unit 52.

With such a configuration, in addition to the exclusive control which alternatively operates the first processing unit 51 and the second processing unit 52, it is possible to limit the operation of the second processing unit 52 and perform the exclusive control in a form of operating the first processing unit 51 as well as the second processing unit 52.

Therefore, it is possible to increase a situation in which the processing by the second processing unit 52 can be executed in the photographing apparatus 1.

A function (first function) other than the sending executed by the first processing unit 51 is an image processing function.

A function (second function) relating to the sending executed by the second processing unit 52 is an automatic sending function of an image executed in parallel with the image processing function executed by the first processing unit 51.

A flaw is heat generated by executing high-load image processing and communication processing in parallel.

With such a configuration, it is possible to restrict heat generation caused by the automatic sending being performed when executing the image processing appropriately.

A function (first function) other than the sending executed by the first processing unit 51 is a sound playback function.

A function (second function) relating to the sending executed by the second processing unit 52 is an automatic sending function of an image executed in parallel with the sound playback function executed by the first processing unit 51.

A flaw is noise generation due to a specific frequency clock used for executing communication processing by the automatic sending function.

With such a configuration, it is possible to prevent noise caused by performing the automatic sending from being included when playing back sound.

A flaw is competing of a physical volume of memory or logical competing of algorithm of software.

With such a configuration, it is possible to allow exclusive control processing from which an appropriate result cannot be acquired if executed simultaneously.

It should be noted that the present invention is not to be limited to the aforementioned embodiment, and that modifications, improvements, etc. within a scope that can achieve the objects of the present invention are also included in the present invention.

In the abovementioned embodiment, it is preferable for the volume for one-time sending in automatic sending to be small. With such a configuration, it becomes easy to discard incomplete data in a case of sending being interrupted and sending data again.

In the aforementioned embodiment, explanations are provided with the example of the photographing apparatus 1 to which the present invention is applied being a digital camera; however, the present invention is not limited thereto in particular.

For example, the present invention can be applied to any electronic device in general having the automatic sending processing function. More specifically, for example, the present invention can be applied to a laptop personal computer, a printer, a television receiver, a video camera, a portable navigation device, a cell phone device, a smartphone, a portable gaming device, and the like.

The processing sequence described above can be executed by hardware, and can also be executed by software.

In other words, the hardware configurations of FIG. 3 are merely illustrative examples, and the present invention is not particularly limited thereto. More specifically, the types of functional blocks employed to realize the above-described functions are not particularly limited to the examples shown in FIG. 3, so long as the photographing apparatus 1 can be provided with the functions enabling the aforementioned processing sequence to be executed in its entirety.

A single functional block may be configured by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In a case in which the processing sequence is executed by software, the program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 of FIG. 2 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, ROM of FIG. 2 in which the program is recorded or a hard disk, etc. included in the storage unit 19 of FIG. 2.

It should be noted that, in the present specification, the steps defining the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A photographing apparatus that sends an image to an external apparatus, the photographing apparatus comprising:
   a communication unit; and
   a processor configured to:
      execute a first function in accordance with an instruction operation or setting, the first function being unrelated to sending from the photographing apparatus to the external apparatus;
      execute a second function other than the first function, the second function relating to sending from the photographing apparatus to the external apparatus via the communication unit;
      when executing the first function, output a request for prioritizing execution of the first function over execution of the second function, in order to prevent a flaw from being caused by performing execution of the first function and execution of the second function in parallel;
      release the request for prioritizing execution of the first function when ending execution of the first function; and
      perform control to determine whether the request for prioritizing execution of the first function has been output, and prioritize execution of the first function over execution of the second function when it is determined that the request for prioritizing execution of the first function has been output.

2. The photographing apparatus according to claim 1, wherein the first function is a photographing function that creates a photographed image by conducting photographing processing on a captured image captured by an image capture unit,
wherein the second function is an automatic sending function that performs processing of automatically sending a photographed image captured by way of the photographing function to the external apparatus, and
wherein the flaw is caused when the photographing processing and the processing of automatically sending are performed in parallel.

3. The photographing apparatus according to claim 1, wherein the processor is configured to output the request for prioritizing execution of the first function at a timing earlier than a timing at which execution of the first function starts.

4. The photographing apparatus according to claim 1, wherein the processor is configured to release the request for prioritizing execution of the first function at a timing later than a timing at which execution of the first function ends.

5. The photographing apparatus according to claim 4, wherein the processor is configured to release the request for prioritizing execution of the first function after a lapse of time during which it is possible to prevent occurrence of the flaw in a case in which execution of the first function is started continuously after execution of the first function has ended.

6. The photographing apparatus according to claim 1, wherein the processor executes at least one of control to stop the second function in order to execute the first function and control to limit the second function in order to prioritize execution of the first function over execution of the second function.

7. A photographing apparatus that sends an image to an external apparatus, the photographing apparatus comprising:
a processor that:
executes a first function that is a function other than sending from the photographing apparatus to the external apparatus;
executes a second function that is a function relating to sending from the photographing apparatus to the external apparatus; and
controls so as to allow exclusive execution of the first function and execution of the second function, in order to prevent a flaw from being caused by performing execution of the first function and execution of the second function in parallel,
wherein the processor controls to restrict or release execution of the second function at a timing different from a timing at which it is necessary to prevent the flaw,
wherein the first function is an image processing function,
wherein the second function is an automatic sending function of an image executed in parallel with the image processing function, and
wherein the flaw is heat generated by executing high-load image processing and communication processing in parallel.

8. A photographing apparatus that sends an image to an external apparatus, the photographing apparatus comprising:
a processor that:
executes a first function that is a function other than sending from the photographing apparatus to the external apparatus;
executes a second function that is a function relating to sending from the photographing apparatus to the external apparatus; and
controls so as to allow exclusive execution of the first function and execution of the second function, in order to prevent a flaw from being caused by performing execution of the first function and execution of the second function in parallel,
wherein the processor controls to restrict or release execution of the second function at a timing different from a timing at which it is necessary to prevent the flaw,
wherein the first function is a sound playback function,
wherein the second function is an automatic sending function of an image executed in parallel with the sound playback function, and
wherein the flaw is noise generation due to a specific frequency clock used for executing communication processing by the automatic sending function.

9. The photographing apparatus according to claim 1, wherein the flaw is competition for a physical volume of memory or logical competition of an algorithm of software.

10. A sending control method executed in a photographing apparatus that sends an image to an external apparatus, the method comprising:
a first processing of executing a first function in accordance with an instruction operation or setting, the first function being unrelated to sending from the photographing apparatus to the external apparatus;
a second processing of executing a second function other than the first function, the second function relating to sending from the photographing apparatus to the external apparatus via communicating processing;
when executing the first function, a control processing of outputting a request for prioritizing execution of the first processing over execution of the second processing, in order to prevent a flaw from being caused by performing execution of the first processing and execution of the second processing in parallel; and
a release processing of releasing the request for prioritizing execution of the first processing when ending execution of the first processing,
wherein the control processing performs control to determine whether the request for prioritizing execution of the first processing has been output, and prioritizes execution of the first processing over execution of the second processing when it is determined that the request for prioritizing execution of the first processing has been output.

11. A non-transitory storage medium encoded with a computer-readable program that enables a computer, which controls a photographing apparatus to send an image to an external apparatus, to execute:
a communication execution function;
a first execution function that executes a first function in accordance with an instruction operation or setting, the first function being unrelated to sending from the photographing apparatus to the external apparatus;
a second execution function that executes a second function other than the first function, the second function relating to sending from the photographing apparatus to the external apparatus via the communication execution function;
a control function that, when performing execution of the first execution function, outputs a request for prioritizing execution of the first execution function over execution of the second execution function, in order to prevent a flaw from being caused by performing execution of the first execution function and execution of the second execution function in parallel; and a release execution processing of releasing the request for prioritizing execution of the first execution function when ending execution of the first execution function, wherein the control function performs control to determine whether the request for prioritizing execution of the first execution function has been output, and prioritizes execution of the first execution function over execution of the second execution function when it is determined that the request for prioritizing execution of the first execution function has been output.

12. The photographing apparatus according to claim 1, wherein the processor is further configured to output warning information regarding execution of the first function, in accordance with an instruction operation at a preparation stage for executing the first function, wherein the processor further determines whether the warning information has been output, and wherein, even if the processor determines that the warning information has been output, the processor performs control so as to prioritize execution of the first function over execution of the second function.

13. The photographing apparatus according to claim 1, wherein the first function is a plurality of first functions, wherein, when executing any one of the plurality of first functions, the processor outputs the request for prioritizing execution of the any one of the plurality of first functions over execution of the second function, in order to prevent the flaw from being caused by performing execution of the any one of the plurality of first functions and execution of the second function in parallel, wherein, when ending execution of the any one of the plurality of first functions, the processor releases the request for prioritizing execution of the any one of the plurality of first functions, and wherein the processor determines whether the request for prioritizing execution of the any one of the plurality of first functions has been output, and performs control so as to prioritize execution of the any one of the plurality of first functions over execution of the second function when determining that the request for prioritizing execution of the any one of the plurality of first functions has been output.

14. The photographing apparatus according to claim 1, wherein, when executing the second function, the processor determines whether the request for prioritizing execution of the first function has been output, and performs control to prioritize execution of the first function over execution of the second function when it is determined that the request for prioritizing execution of the first function has been output.

* * * * *